Dec. 14, 1954   M. F. LEMROW   2,697,042
NOVELTY CAKE
Filed Feb. 9, 1951
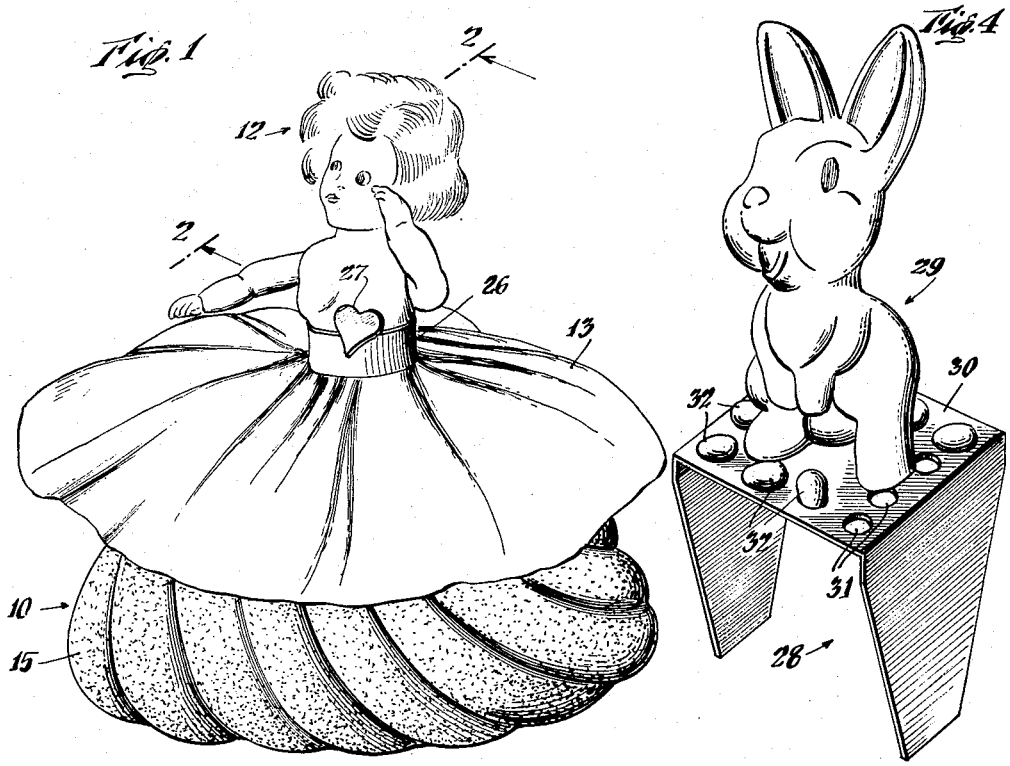
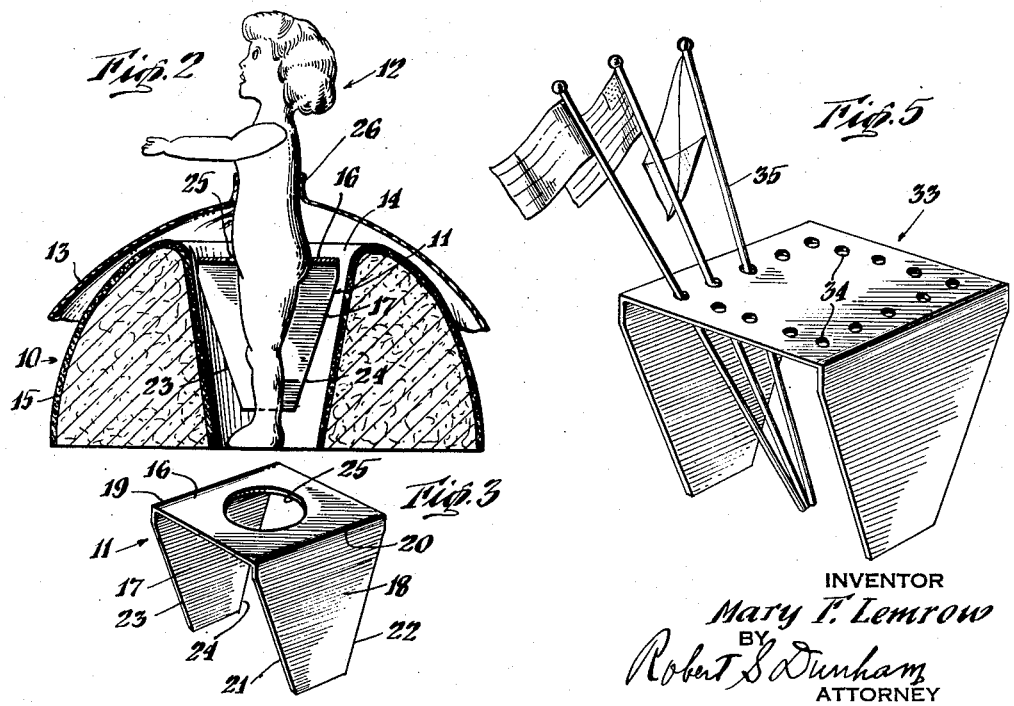
INVENTOR
Mary F. Lemrow
BY
Robert S. Dunham
ATTORNEY United States Patent Office 2,697,042
Patented Dec. 14, 1954

2,697,042

NOVELTY CAKE

Mary F. Lemrow, New York, N. Y., assignor to Cushman's Sons, Inc., Long Island City, N. Y., a corporation of New York Application February 9, 1951, Serial No. 210,231

5 Claims. (Cl. 99—92)

This invention relates to a novelty cake, and more particularly to an edible baked product for use at parties or at functions featuring a festive occasion or commemorative event.

In its more special aspects, the invention comprises a cake with which is associated a stand or receptacle for sustaining a figure in a manner not to impair the edible qualities of the cake, nor appreciably to mar the appearance of the cake before or even upon removal of the figure or the stand from the cake. The stand or receptacle is suited for receiving and supporting in a complemental relationship to the cake a single figure or other ornament, or several decorative articles. The figure or the stand is adaptable for supporting a cover for the cake and which enters into and contributes to the effect of the complete assemblage, as, for example, a cover in the form of a circular skirt extending over the cake and draped from a doll which is located at the center of the cake. The skirt is preferably made of a non-contaminatable sheet of plastic material draped and pleated in an appropriate manner, and serves as a protective screen for the cake.

Other objects and uses of the invention will appear from a detailed description of the principle of the invention which consists of the features of construction and combination of parts hereinafter described and claimed.

Fig. 1 is a perspective view of a novelty cake embodying the present invention;

Fig. 2 is a vertical section on line 2—2 of Fig. 1;

Fig. 3 is a perspective view of a stand forming part of the invention;

Fig. 4 is a perspective view of a modified form of stand suitable for supporting a figure on its top side; and Fig. 5 is still another form of stand arranged for supporting staffs and like articles.

The embodiment of the invention illustrated in Figs. 1, 2 and 3 includes a cake 10, a stand 11, a figure 12 and a cover 13 for the cake. The cover is secured to the figure and flares outwardly over the top of the cake. The cake has a central opening 14 extending downwardly from its top surface.

The cake which is illustrated in the accompanying drawing is of a type which may be baked in a ring mould, or in an elongated mould having an interior side wall removed from its center and which leaves a central opening, but the cake may be prepared and formed in any manner desired. An icing 15 is preferably provided over the exterior of the cake and this may be colored or decorated in harmony with the complete assemblage.

The stand 11 establishes the relationship between the cake 10 and the central figure 12. It may be made from any suitable non-contaminatable material, such as a plastic composition or relatively stiff paper. The conformation of the stand should be such as to enable its insertion within the opening in the cake and to seize sufficiently on the walls of the opening to remain erect and stable enough to support a figure or other article. As illustrated in the drawing, it is provided with a flat top 16 having two depending legs 17 and 18 which are produced by bending a pre-cut piece of sheet material along the lines of fold 19 and 20. A prerequisite of the stand is that it shall contact with the inner wall of the cake only at a sufficient number of points to enable the cake to maintain the stand erect. For example, a stand having a square horizontal projection with a diagonal measurement corresponding to at least the diameter of the circular hole at the level from which the projection is taken, is suitable. The top side of the stand should preferably be located below the crown of the cake, and in a manner as illustrated in Fig. 2, for example. Owing to the tendency of the downwardly extending legs to separate from each other, the side edges 21, 22, 23 and 24 of the legs will engage with the downwardly tapering hole in the cake, and thereby contribute to the stability of the stand. The side edges of the legs correspond to elements of an inverted frustum of a cone.

The stand illustrated in Fig. 3 has a square top side 16 with opposite edges extending a short distance into the side edges of the legs 17 and 18, and it is apparent that when this stand is inserted in a cake having a circular central opening of the conical conformation illustrated in Fig. 2, the upper four corners of the stand will come into contact with the interior wall of the opening and locate the stand with its top side just below the crown of the cake. In this manner the exterior of the cake or of any icing which may be employed, and which is more or less directly visible when the figure or the stand is removed, is not marred or broken. As a practical matter, the exterior of the cake is contacted by the stand only at a minimum number of points of which all are located within the opening 14 and below the crown of the cake. Consequently, when the figure and the stand are removed, the attractiveness of the cake is not destroyed by unsightly markings or the dislodgement of icing.

As illustrated in Figs. 1 and 2, the stand 11 is provided with a central opening 25 for receiving the figure 12, which, in the present instance, is a doll. The doll is held erect and braced laterally by the edge of the opening 25 with which it comes into contact.

The doll 12 is provided with a skirt 13 which encircles the doll and flares outwardly above the cake. The skirt is fastened to the doll by a waist band 26. A decorative effect may be produced by employing a sticker in the form of a heart 27 for holding the waist band in place. The doll and the skirt are preferably made from a plastic composition which is substantially tasteless, odorless and non-toxic. A decorated sheet of synthetic organic plastic suitably gathered to simulate a skirt has been found satisfactory. In addition to providing a pleasing appearance, the skirt serves as a cover for protecting the cake against deleterious material, such as might emanate from the hair of the doll.

The stand 28 illustrated in Fig. 4 is similar to the stand illustrated in Fig. 3, except for the omission of the central opening. This stand is suitable for supporting a figure 29 on the upper surface 30 of the stand. In this instance the figure represents an Easter bunny and the stand may be provided, if desired, with a number of openings 31 for locating a plurality of candy pieces 32 in the form of eggs. The openings may be omitted and in that case any articles resting on the surface of the stand would be retained by the surrounding crown of the cake. In Fig. 5 I have illustrated another form of stand 33 which is provided with a plurality of openings 34 suitably placed for accommodating and supporting the staffs 35 of a number of flags or candy canes.

While I have described a number of applications of the principle disclosed, it is to be understood that the invention is not limited to symbolizing any particular event, or to assume the particular forms illustrated in the drawing, except to the extent as the same is included within the scope of the claims which follow.

What is claimed is:

1. In combination, an edible cake having a coating of frosting thereon and an opening extending downwardly from the top surface of the cake, a figure, a stand located in said opening, said stand having outer portions engaging the wall of said opening and inner portions for laterally supporting said figure in spaced relationship to said cake, and a cover attached to and encircling said figure and extending therefrom above the cake and toward the perimeter of the cake.

2. In combination, an edible cake having an opening extending downwardly from the top surface of the cake, a figure, and a stand located in said opening for supporting said figure in a position extending upwardly to above the top surface of the cake, said figure being insertable and removable from the stand without disturbing the exterior of said cake, and a skirt of plastic sheet material attached to said figure and draped above the upper portion of the cake around said figure and thereby covering the portion of the cake surrounding the figure to protect the cake from receiving extraneous material which might emanate from the figure.

3. An edible cake having a device for supporting an ornamental element out of contact with said cake, said cake having an inner wall surrounding the central vertical axis of the cake and defining a passage tapering downwardly from the upper surface of the cake, said device comprising sheet material shaped to provide a multi-sided planar portion with its maximum diagonal dimension measuring less than the maximum diameter of said passage and more than the minimum diameter of said passage and disposed within said passage below the top of said cake in a substantially horizontal position and a plurality of leg portions holding said planar portions stable with respect to said cake, said leg portions extending from opposite sides of said planar portion and engaging minute areas of the wall defining said tapered passage below said planar portion.

4. The combination as claimed in claim 3, in which said planar portion is perforated for receiving said ornamental element and the edge of the perforation laterally supports said ornamental element out of contact with the cake.

5. In combination, an edible cake body having a clear tubular passage defined by a substantially vertical inner wall extending downwardly from an opening in the top surface of the cake body, and a device for spacing an article in said passage out of contact with said inner wall of said cake body, said device having such form as to provide a shelf-like portion and a leg portion extending from each of opposite rectilinear edges of said shelf-like portion, said shelf-like portion being horizontally disposed in said passage and said leg portions being bent downwardly from said shelf-like portion on crease lines coincident with said rectilinear edges and engaging limited areas of said inner wall of said cake body whereby said shelf-like portion is supported centrally of said passage.

References Cited in the file of this patent

UNITED STATES PATENTS

| Number | Name | Date |
|---|---|---|
| 2,244,160 | Jacobson | June 3, 1941 |
| 2,334,497 | Lemrow | Nov. 16, 1943 |

OTHER REFERENCES

"Mastercraft in Cakes and Decorating," W. C. Baker, Bakers' Helper Company, Chicago, Illinois, 1925, pages 88–107.